H. R. GILSON.
HOSE COUPLING.
APPLICATION FILED NOV. 15, 1918.
1,343,967.
Patented June 22, 1920.
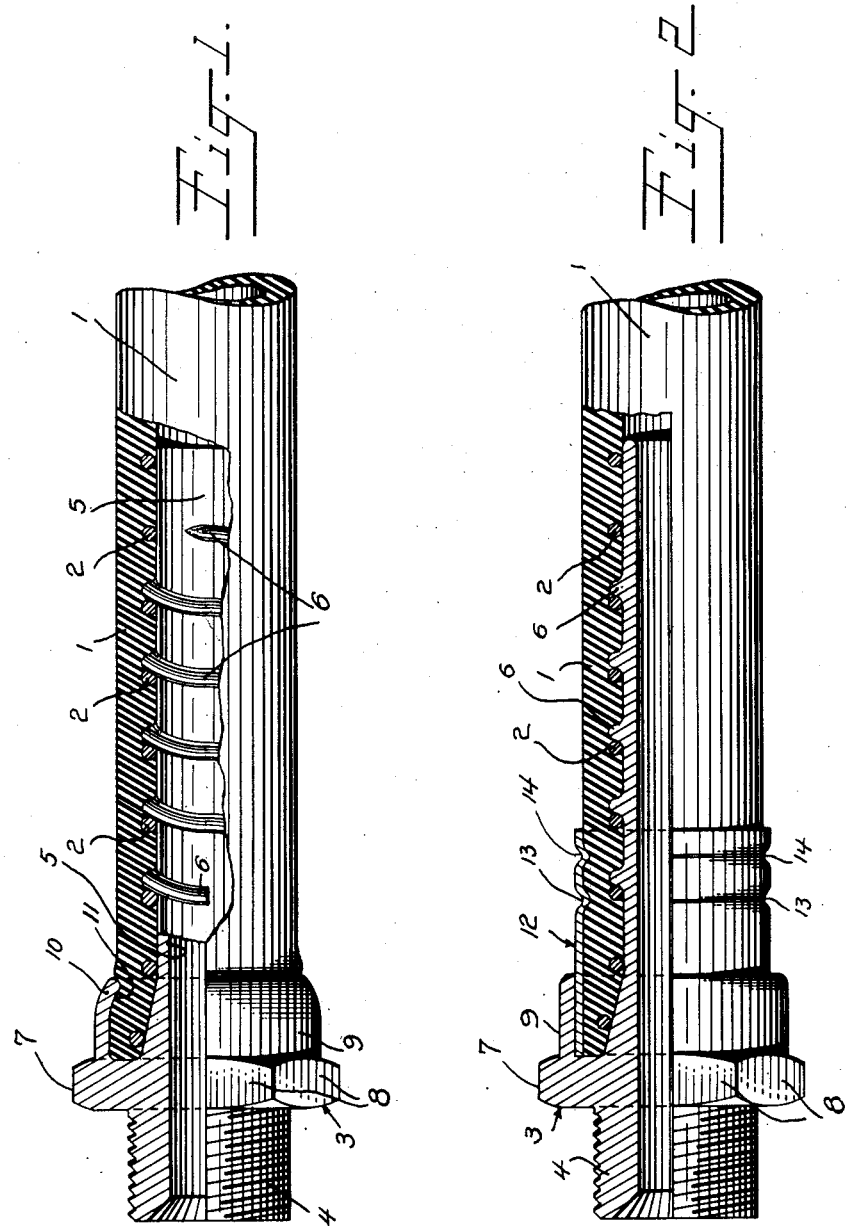
WITNESS.
INVENTOR.
H. R. Gilson,
BY HIS
ATTORNEY.

UNITED STATES PATENT OFFICE.

HENRY R. GILSON, OF NEW ROCHELLE, NEW YORK, ASSIGNOR TO NEW YORK BELTING & PACKING COMPANY, A CORPORATION OF NEW YORK.

HOSE-COUPLING.

1,343,967.   Specification of Letters Patent.   Patented June 22, 1920.

Application filed November 15, 1918. Serial No. 262,638.

*To all whom it may concern:*

Be it known that I, HENRY R. GILSON, a citizen of the United States, residing at New Rochelle, in the county of Westchester and State of New York, have invented certain new and useful Improvements in Hose-Couplings, of which the following is a full, clear, and exact description.

This invention relates to hose couplings and has for an object to provide improved means for making connections with flexible hose, the aim being to secure a simple, compact, and efficient coupling adapted to maintain a firm, leak-proof grip upon a hose under all conditions of service.

With these and other objects in view which will hereinafter readily appear, the invention consists in the novel construction, combination and arrangement of parts, hereinafter more fully described and claimed.

Heretofore hose couplings have been used embodying a plurality of coöperating threaded parts adapted to take a wedge grip upon the hose. Such couplings are difficult and costly to manufacture and are open to the further objections that they are cumbersome and do not maintain a leak-proof grip upon the hose under all conditions of service. The present invention provides a one-piece, compact coupling which may be easily applied to a hose and is adapted to resist in a high degree stresses tending to separate the hose and coupling.

A practical embodiment of the invention is represented in the accompanying drawings forming a part of this specification, in which:

Figure 1 is a longitudinal view, with portions broken away illustrating one embodiment of the invention.

Fig. 2 is a similar view illustrating a modified form of construction.

Referring to the drawings, the numeral 1 indicates a flexible hose which may be formed of rubber, fabric and rubber, or any other suitable fluid-proof material. Embedded in the hose is a helical reinforcing wire 2. Secured to the end of the hose is a coupling 3, having a threaded end 4 adapted for connection to any suitable conduit or receptacle, and a tapered nipple 5 formed externally with a helical thread 6 which engages the helical wire reinforcement 2 of the hose. Arranged intermediate the ends of the coupling is an annular shoulder 7 provided with a plurality of flattened surfaces 8 that afford suitable purchase for a wrench. Integrally united to and extending at right angles from the shoulder 7 is an annular flange or ferrule 9 formed of ductile metal adapted to be contracted upon the hose. This ferrule overlies the nipple 5 and is arranged concentric therewith.

In applying the coupling, its nipple end 5 is screwed into the hose until the annular shoulder 7 abuts the end thereof, in which position, the ferrule 9 will surround the end of the hose. The rim 10 of the ferrule is then contracted so as to grip the hose firmly between it and the nipple, producing a shoulder 11 upon the hose adapted to resist stresses tending to separate the coupling from the hose.

The thread 6 upon the nipple member 5 of the coupling, which engages the helical wire reinforcement 2 of the hose, acts to prevent longitudinal separation of the parts, while the contracted ferrule serves to resist turning movement of the coupling with relation to the hose and also to prevent longitudinal separation of the parts.

In the modified form of construction illustrated in Fig. 2, the ferrule is lengthened by the employment of a sleeve 12 of ductile metal which is contracted at points intermediate its length to firmly grip the hose, as shown at 13 and 14.

While one of the preferred embodiments of the invention has been described, it is obvious that various changes in form, arrangement and materials may be made without sacrificing any of the advantages of the invention or departing from the spirit and scope of the invention as set forth in the appended claims.

Having thus described my invention what I claim and desire to protect by Letters Patent is:—

1. In combination, a compressible conduit, and a coupling therefor having integrally united parts one of which engages the interior and the other the exterior of said conduit, the exterior of said conduit and said exteriorly engaging part having complementary locking parts to prevent longitudinal and turning movement of the conduit relative to said coupling, and the interior of said conduit and said interiorly engaging part having complementary parts coöperating with said first mentioned complementary parts to prevent longitudinal movement of the conduit relative to said coupling.

2. In combination, a compressible conduit, and a coupling therefor having a threaded nipple and an annular ferrule, said ferrule being arranged concentric of said nipple and integrally united thereto, portions of said ferrule being contracted upon the end of said compressible conduit.

3. An internally threaded conduit in combination with a coupling having integral nipple and ferrule portions in concentric spaced relation defining an annular recess for reception of an end of the conduit, said nipple having external threads coöperating with those inside the conduit, and said ferrule being flanged inwardly to grip the conduit and in conjunction with the external threads on the nipple to hold the conduit against both endwise and angular movement relative to the coupling.

Signed at New York, in the county and State of New York, this 9th day of November, 1918.

HENRY R. GILSON.